United States Patent
Shen et al.

(10) Patent No.: US 12,556,509 B2
(45) Date of Patent: Feb. 17, 2026

(54) METHOD AND APPARATUS FOR SELECTING EDGE APPLICATION SERVER, AND NETWORK ELEMENT DEVICE, USER EQUIPMENT AND STORAGE MEDIUM

(71) Applicant: Beijing Xiaomi Mobile Software Co., Ltd., Beijing (CN)

(72) Inventors: Yang Shen, Beijing (CN); Jianfeng Qi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 12 days.

(21) Appl. No.: 18/702,497

(22) PCT Filed: Oct. 18, 2021

(86) PCT No.: PCT/CN2021/124504
§ 371 (c)(1),
(2) Date: Apr. 18, 2024

(87) PCT Pub. No.: WO2023/065088
PCT Pub. Date: Apr. 27, 2023

(65) Prior Publication Data
US 2024/0414119 A1 Dec. 12, 2024

(51) Int. Cl.
*H04L 61/4511* (2022.01)
*H04L 65/1101* (2022.01)

(52) U.S. Cl.
CPC ...... *H04L 61/4511* (2022.05); *H04L 65/1101* (2022.05)

(58) Field of Classification Search
CPC .......... H04L 61/4511; H04L 65/1101
See application file for complete search history.

(56) References Cited

U.S. PATENT DOCUMENTS

| 7,143,187 B1* | 11/2006 | Takeda | H04L 69/167 |
| | | | 709/227 |
| 2021/0226914 A1* | 7/2021 | Shan | H04L 61/4552 |
| 2022/0263788 A1* | 8/2022 | Lee | H04L 61/4511 |

(Continued)

FOREIGN PATENT DOCUMENTS

| CN | 113115480 A | 7/2021 |
| WO | 2021/138069 A1 | 7/2021 |

OTHER PUBLICATIONS

S2-2107670 3GPP TSG-SA WG2 Meeting #147E available Oct. 11, 2021 (Year: 2021).*

(Continued)

*Primary Examiner* — David R Lazaro
(74) *Attorney, Agent, or Firm* — Volpe Koenig

(57) ABSTRACT

The present disclosure relates to method and apparatus for selecting an edge application server, and element network device, user equipment and storage medium. The method includes: a user equipment receiving first indication information, which is sent by an SMF, wherein the first indication information is used for indicating the priority of domain name system (DNS) information; and the user equipment making a DNS policy decision according to the first indication information, and sending a DNS query request to an EASDF, wherein the DNS query request is used by the EASDF to execute the discovery or selection of an edge application server (EAS).

18 Claims, 3 Drawing Sheets

201 — The terminal receives first indication information sent by SMF

202 — The terminal makes a DNS policy decision based on the first indication information and sends a DNS query request to EASDF

(56) References Cited

U.S. PATENT DOCUMENTS

| | | | |
|---|---|---|---|
| 2024/0154931 A1* | 5/2024 | Tonesi | H04L 61/4511 |
| 2024/0187374 A1* | 6/2024 | Tang | H04L 41/085 |
| 2024/0283772 A1* | 8/2024 | Karampatsis | H04L 61/4511 |
| 2024/0414119 A1* | 12/2024 | Shen | H04L 61/4511 |
| 2025/0016581 A1* | 1/2025 | Shen | H04W 8/005 |
| 2025/0168281 A1* | 5/2025 | Lee | H04L 61/5007 |
| 2025/0240241 A1* | 7/2025 | Shen | H04L 45/745 |

OTHER PUBLICATIONS

3GPP Directory Listing with publication dates printed Jun. 2025 (Year: 2025).*
International Search Report, PCT/CN2021/124504, Jun. 23, 2022, 2 pgs.
3GPP TSG-SA WG2 Meeting #147E, E-Meeting, Oct. 17-22, 2021, S2-2107670, 10 pgs.
3GPP TSG-SA WG2 Meeting #147E, E-Meeting, Oct. 17-22, 2021, S2-2107671, 11 pgs.
3GPP TS 23.501—3rd Generation Partnership Project; Technical Specification Group Services and System Aspects;System architecture for the 5G System (5GS);Stage 2(Release 18).
3GPP TS 23.502—3rd Generation Partnership Project; Technical Specification Group Services and System Aspects;Procedures for the 5G System (5GS); Stage 2(Release 18).
3GPP TS 23.548—3rd Generation Partnership Project; Technical Specification Group Services and System Aspects;5G System Enhancements for Edge Computing;Stage 2(Release 18).

* cited by examiner

METHOD AND APPARATUS FOR SELECTING EDGE APPLICATION SERVER, AND NETWORK ELEMENT DEVICE, USER EQUIPMENT AND STORAGE MEDIUM

CROSS REFERENCE TO RELATED APPLICATION

The present application is a U.S. National Stage of International Application No. PCT/CN2021/124504, filed on Oct. 18, 2021, the content of which is incorporated by reference herein in its entirety.

TECHNICAL FIELD

The present disclosure relates to method and apparatus for selecting edge application server, network element device, a terminal (UE, User Equipment) and a storage medium.

BACKGROUND

In addition to meeting the connection needs between people, 5G networks also need to solve the communication needs between people and things, and between things and things. The nearly 100 ms network latency of the 4G network cannot meet the needs of business scenarios such as Internet of Vehicles, industrial control, and AR/VR. The network requires lower processing latency and higher processing capability, and needs to provide data processing capability and service near the edge of the network where data is generated.

SUMMARY

According to a first aspect of the present disclosure, there is provided a method for selecting an edge application server, including:
 a terminal receives first indication information sent by a session management function SMF, where the first indication information is configured to indicate a priority of domain name system DNS information; and
 the terminal makes a DNS policy decision based on the first indication information, and sends a DNS query request to an edge application server discovery function EASDF, where the DNS query request is used for the EASDF to perform discovery or selection of the edge application server EAS.

In some embodiments, the first indication information includes:
 priority indication information; or
 a service identification; or
 an application identification; or
 a priority indication and an application wildcard indication; or
 a priority indication and a specific application identification.

In some embodiments, the DNS policy decision includes:
 prioritizing execution of a DNS request provided by the SMF; or
 prioritizing execution of a DNS request configured locally by the terminal; or
 the terminal determining an execution strategy of a DNS request by itself.

In some embodiments, the terminal receives the first indication information sent by SMF includes:
 during a protocol data unit PDU session establishment procedure, the terminal receives a first message sent by the SMF, where the first message contains information about EASDF selected by the SMF for the PDU session.

In some embodiments, the information about the EASDF is obtained by the SMF based on EAS deployment information; and the EAS deployment information is obtained from policy information of the PDU session or subscription information of the terminal.

In some embodiments, the terminal has a DNS client function and supports at least one of the following functions:
 receiving the information about the EASDF sent by the SMF;
 sending the DNS query request to the EASDF or DNS server determined by the SMF;
 sending the EASDF or DNS server determined by the SMF to an upper layer application or service in the terminal; and
 receiving the DNS query request from the upper layer application or service in the terminal, and sending the received DNS query request to the EASDF or DNS server determined by the SMF.

In some embodiments, the DNS client function of the terminal is located in an operating system of the terminal or a hardware of the terminal.

In some embodiments, when the DNS client function of the terminal is located in the hardware, the DNS client function of the terminal is supported and implemented by both the hardware and the operating system.

According to a second aspect of the present disclosure, there is provided a method for selecting edge application servers, including:
 a SMF sends first indication information to a terminal, wherein the first indication information is configured to indicate a priority of DNS information.

In some embodiments, the first indication information includes:
 priority indication information; or,
 a service identification; or,
 an application identification; or,
 a priority indication and an application wildcard indication; or,
 a priority indication and a specific application identification.

In some embodiments, the method further includes:
 the SMF obtains EAS deployment information, and selects EASDF for the terminal based on the EAS deployment information; and
 during a PDU session establishment procedure, the SMF sends a first message to the terminal, wherein the first message contains information about the EASDF.

In some embodiments, the SMF obtains the EAS deployment information includes:
 the SMF obtains the EAS deployment information from policy information of the PDU session or subscription information of the terminal.

In some embodiments, the SMF obtains a DNS policy decision of the terminal and performs report or redirection based on an operator policy.

In some embodiments, the operator policy includes:
 when the SMF determines that a DNS target object of the terminal is not an EASDF determined by the SMF based on a DNS query request of the DNS policy decision, performing DNS change report or DNS query request redirection according to at least one of the following:
 a network status, a DNS priority, and a service characteristic.

In some embodiments, the method further includes:
when the SMF detects that the DNS target object of the terminal is not the EASDF determined by the SMF, in response to a subscribed DNS change notification, performing a subscription report.

In some embodiments, the method further includes:
when the SMF detects that the DNS target object of the terminal is not the EASDF determined by the SMF, in response to performing the DNS query redirection of the operator policy, performing the DNS query request redirection and sending the DNS query request to the EASDF determined by the SMF for the terminal.

According to a third aspect of the present disclosure, there is provided a device for selecting an edge application server, applied to a terminal, including:
a receiving unit configured to receive first indication information sent by SMF, wherein the first indication information is configured to indicate a priority of domain name system DNS information; and
a sending unit configured to make a DNS policy decision based on the first indication information, and send a DNS query request to EASDF, wherein the DNS query request is used for the EASDF to perform discovery or selection of the edge application server EAS.

In some embodiments, the first indication information includes:
priority indication information; or
a service identification; or
an application identification; or
a priority indication and an application wildcard indication; or
a priority indication and a specific application identification.

In some embodiments, the DNS policy decision includes:
prioritizing execution of a DNS request provided by the SMF; or,
prioritizing execution of a DNS request configured locally by the terminal; or,
the terminal determining an execution strategy of a DNS request by itself.

In some embodiments, the receiving unit is further configured to:
during a PDU session establishment procedure, receive a first message sent by the SMF, wherein the first message contains information about EASDF selected by the SMF for the PDU session.

In some embodiments, the information about the EASDF is obtained by the SMF based on EAS deployment information; and the EAS deployment information is obtained from policy information of the PDU session or subscription information of the terminal.

In some embodiments, the terminal has a DNS client function and supports at least one of the following functions:
receiving the information about the EASDF sent by the SMF;
sending the DNS query request to the EASDF or DNS server determined by the SMF;
sending the EASDF or DNS server determined by the SMF to an upper layer application or service in the terminal; and
receiving the DNS query request from the upper layer application or service in the terminal, and sending the received DNS query request to the EASDF or DNS server determined by the SMF.

In some embodiments, the DNS client function of the terminal is located in an operating system or a hardware of the terminal.

In some embodiments, when the DNS client function of the terminal is located in the hardware, the DNS client function of the terminal is supported and implemented by both the hardware and the operating system.

According to a fourth aspect of the present disclosure, there is provided a device for selecting an edge application server, applied to SMF, including:
a sending unit configured to send first indication information to a terminal, wherein the first indication information is configured to indicate a priority of DNS information.

In some embodiments, the first indication information includes:
priority indication information; or
a service identification; or
an application identification; or
a priority indication and an application wildcard indication; or
a priority indication and a specific application identification.

In some embodiments, the device further includes:
an obtaining unit configured to obtain EAS deployment information; and
a selecting unit configured to select EASDF for the terminal based on the EAS deployment information;
where the sending unit is further configured to send a first message to the terminal during a PDU session establishment procedure, and the first message contains information about the EASDF.

In some embodiments, the obtaining unit is further configured to:
obtain the EAS deployment information from policy information of the PDU session or subscription information of the terminal.

In some embodiments, the obtaining unit is further configured to obtain a DNS policy decision of the terminal, and the sending unit is further configured to perform report or redirection based on an operator policy.

In some embodiments, the operator policy includes:
when determining that a DNS target object of the terminal is not an EASDF determined by the SMF based on a DNS query request of the DNS policy decision, performing DNS change report or DNS query request redirection according to at least one of the following:
a network status, a DNS priority, and a service characteristic.

In some embodiments, the device further includes:
a first processing unit configured to, when detecting that the DNS target object of the terminal is not the EASDF determined by the SMF, perform a subscription report in response to a subscribed DNS change notification.

In some embodiments, the device further includes:
a second processing unit configured to, when detecting that the DNS target object of the terminal is not the EASDF determined by the SMF, in response to performing the DNS query redirection of the operator policy, perform the DNS query request redirection, and send the DNS query request to the EASDF determined by the SMF for the terminal.

According to a fifth aspect of the present disclosure, there is provided a terminal, including a processor, a transceiver, a memory, and an executable program stored in the memory and capable of being run by the processor, when the processor runs the executable program, it executes steps of the method for selecting the edge application server.

According to a sixth aspect of the present disclosure, there is provided a network element device, including a processor, a transceiver, a memory, and an executable program stored in the memory and capable of being run by the processor, when the processor runs the executable program, it executes steps of the method for selecting the edge application server.

According to a seventh aspect of the present disclosure, there is provided a storage medium on which an executable program is stored, when the executable program is executed by a processor, the steps of the method for selecting the edge application server are implemented.

BRIEF DESCRIPTION OF THE DRAWINGS

The accompanying drawings, which are incorporated in and constitute a part of this specification, illustrate embodiments consistent with the disclosure and together with the description serve to explain the principles of the embodiments of the disclosure.

DETAILED DESCRIPTION

Figure 1:
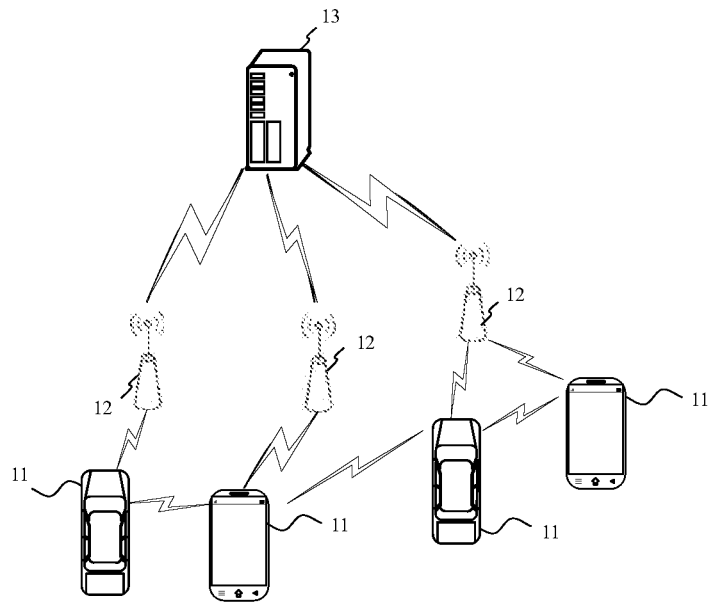
FIG. 1 is a schematic structural diagram of a wireless communication system according to an exemplary embodiment.

Exemplary embodiments will be described in detail herein, examples of which are illustrated in the accompanying drawings. When the following description refers to the drawings, the same numbers in different drawings refer to the same or similar elements unless otherwise indicated. The implementations described in the following exemplary embodiments do not represent all implementations consistent with embodiments of the present disclosure. Rather, they are merely examples of apparatus and methods consistent with aspects of embodiments of the present disclosure as detailed in the appended claims.

The terminology used in the embodiments of the present disclosure is for the purpose of describing specific embodiments only and is not intended to limit the embodiments of the present disclosure. As used in the embodiments of this disclosure and the appended claims, the singular forms "a," "the" and "the" are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc. may be used to describe various information in the embodiments of the present disclosure, the information should not be limited to these terms. These terms are only used to distinguish information of the same type from each other. For example, without departing from the scope of the embodiments of the present disclosure, the first information may also be called second information, and similarly, the second information may also be called first information. Depending on the context, the word "if" as used herein may be interpreted as "when" or "as" or "in response to determining."

Edge computing is a technology that supports operators and third-party application services to be deployed near the access point of the network where the UE is located, thereby achieving efficient service delivery by reducing end-to-end delay and load on the transmission network. 5G edge computing is a combination of edge infrastructure, edge network, edge computing platform and edge applications. The User Plane Function (UPF) serves as a connection anchor and collaborates with the 5G core network, edge computing platform and terminals to meet various functions in the 5G edge computing scenario. The interaction of Session Management Function (SMF), UPF and Policy Control Function (PCF) realizes the splitting and policy functions of 5G edge computing. The unified capability opening node Network Exposure Function (NEF) is responsible for the interaction between external edge applications and the 5G network. The edge computing platform, as an Application Function (AF) in the 5G network, manages sessions and policies through NEF/PCF-SMF-UPF. Edge applications deployed on the edge computing platform can belong to one or more network slices.

The 5G network supports the deployment of an Edge Hosting Environment (EHE) in the data network DN outside the anchor UPF of the session. EHE may be under the control of the operator or a third party. The local deployment of the EHE network can have user plane connections with the centralized deployment of PSA UPF and the local deployment of PSA UPF in the same data network. 3GPP 5G network supports Edge Application Server EAS Discovery Function (EASDF). EASDF has a user plane connection with PSA UPF, processes Domain Name System (DNS) messages according to SMF instructions, and is used to transmit DNS signaling with the terminal (User Equipment, UE).

An edge application service may be provided by multiple edge application servers EAS. When starting the edge application service, the terminal UE needs to know the IP address of the application server. The terminal UE can select the appropriate EAS (such as the EAS closest to the UE) through the EASDF function, so that the data flow can be routed from the local to the EAS, thereby optimizing the service delay, data routing path and user service experience.

EAS discovery refers to the process in which the terminal UE discovers the appropriate EAS IP address through DNS. 3GPP supports EAS discovery and rediscovery functions. EAS rediscovery is the process of rediscovering and selecting an EAS when the previous EAS cannot be used or is no longer the optimal EAS. DNS servers can be deployed in different locations on the network. DNS servers can be deployed as a central DNS (C-DNS) resolver/server, or as a local DNS (L-DNS) resolver/server.

However, in the DNS query of edge computing application services, how to ensure the optimization of EAS and how to ensure that the terminal UE uses the EASDF provided by the network to find the best EAS, so as to truly optimize the service delay, data routing path and user service experience, are still issues yet to be resolved.

Please refer to FIG. 1, which shows a schematic structural diagram of a wireless communication system provided by an embodiment of the present disclosure. As shown in FIG. 1, the wireless communication system is a communication system based on cellular mobile communication technology. The wireless communication system may include several terminals 11 and several base stations 12.

The terminal 11 may be a device that provides voice and/or data connectivity to the user. The terminal 11 can communicate with one or more core networks via a Radio Access Network (RAN). The terminal 11 can be an Internet of Things terminal, such as a sensor device, a mobile phone (or a "cellular" phone) and a computer with the Internet of Things terminal, for example, the computer with the Internet of Things terminal can be a fixed, portable, pocket-sized, handheld, computer-built-in or vehicle-mounted device, such as station (STA), subscriber unit, subscriber station, mobile station, mobile, remote station, access point, remote terminal, access terminal, user terminal, user agent, terminal (user device), or user equipment (UE). Alternatively, the terminal 11 may be a device of an unmanned aerial vehicle. Alternatively, the terminal 11 may also be a vehicle-mounted device, for example, it may be a traveling computer with a wireless communication function, or a wireless communication device externally connected to the traveling computer. Alternatively, the terminal 11 may also be a roadside device, for example, it may be a streetlight, a signal light or other roadside device with wireless communication function.

The base station 12 may be a network-side device in a wireless communication system. The wireless communication system may be the 4th generation mobile communication technology (4G) system, also called the Long Term Evolution (LTE) system; or the wireless communication system may also be a 5G system, also called new radio (NR) system or 5G NR system. Alternatively, the wireless communication system may be any generation system. The access network in the 5G system can be called NG-RAN (New Generation-Radio Access Network), or MTC system.

The base station 12 may be an evolved base station (eNB) used in the 4G system. Alternatively, the base station 12 may also be a base station (gNB) that adopts a centralized distributed architecture in the 5G system. When the base station 12 adopts a centralized distributed architecture, it usually includes a central unit (CU) and at least two distributed units (DUs). The central unit is provided with a protocol stack including a Packet Data Convergence Protocol (PDCP) layer, a Radio Link Control protocol (RLC) layer, and a Media Access Control (MAC) layer. The distributed unit is provided with a physical (PHY) layer protocol stack. The embodiment of the present disclosure does not limit the specific implementation of the base station 12.

A wireless connection can be established between the base station 12 and the terminal 11 through wireless air interface. In different implementations, the wireless air interface is a wireless air interface based on the fourth generation mobile communication network technology (4G) standard; or the wireless air interface is a wireless air interface based on the fifth generation mobile communication network technology (5G) standard, for example, the wireless air interface is a new radio; or the wireless air interface may also be a wireless air interface based on the next generation mobile communication network technology standard of 5G.

In some embodiments, an E2E (End to End) connection can also be established between terminals 11, for example, in a scenario such as V2V (vehicle to vehicle) communication, V2I (vehicle to Infrastructure) communication and V2P (vehicle to Pedestrian) communication in vehicle networking communication (vehicle to everything, V2X).

In some embodiments, the above-mentioned wireless communication system may also include a network management device 13.

The execution subjects involved in the embodiments of the present disclosure include but are not limited to: terminals (UE, User Equipment) in the cellular mobile communication system, and base stations of cellular mobile communication, etc.

Figure 2:
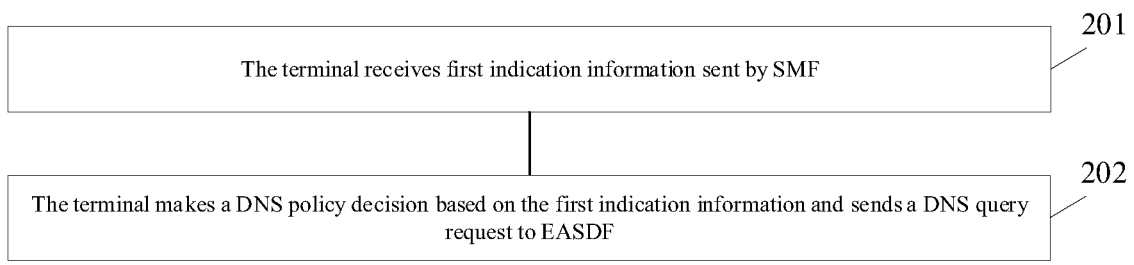
FIG. 2 is a schematic flowchart of a method for selecting an edge application server according to an exemplary embodiment.

FIG. 2 is a schematic flow chart of a method for selecting an edge application server according to an exemplary embodiment. As shown in FIG. 2, the method for selecting the edge application server In embodiments of the present disclosure is applied to the terminal side. The method for selecting the edge application server In embodiments of the present disclosure includes the following processing steps:

Step 201: The terminal receives first indication information sent by SMF.

In embodiments of the present disclosure, the first indication information is configured to indicate the priority of the domain name system DNS information. That is, the SMF determines the recommended DNS information for the terminal. The DNS information includes server-related information that instructs the terminal to perform DNS access, such as the IP address information of the relevant server. Specifically, the first indication information includes at least one of the following: priority indication information; service identification; application identification; priority indication and application wildcard indication; priority indication and specific application identification.

Step 202: The terminal makes a DNS policy decision based on the first indication information and sends a DNS query request to EASDF.

In embodiments of the present disclosure, the DNS query request is used for the EASDF to perform the discovery or selection of the edge application server EAS.

The DNS policy decision includes: prioritizing the execution of the DNS request provided by the SMF; or prioritizing the execution of the DNS request set locally by the terminal; or the terminal deciding the execution strategy of the DNS request on its own.

Specifically, in embodiments of the present disclosure, the terminal UE receives the priority indication of the DNS information provided by the SMF, and makes a DNS policy decision based on the priority indication of the DNS information. Based on the DNS policy decision, the terminal sends a DNS query request to the EASDF, thereby performing discovery or selection of edge application servers. The priority indication of DNS information here includes any of the following: priority indication (explicit), service or application identification (implicit), priority indication and application wildcard indication, priority indication and specific application identification.

In embodiments of the present disclosure, the terminal receives the first indication information sent by SMF, which specifically includes:

During the establishment procedure of a Protocol Data Unit (PDU) session, the terminal receives a first message sent by the SMF, where the first message contains information about the EASDF selected by the SMF for the PDU session. The first message here includes the PDU session establishment accept message. Specifically, during the PDU session establishment procedure, the SMF selects an EASDF as the DNS server of the PDU session, and sends the EASDF IP address to the UE in the PDU session establishment accept message.

In some embodiments, the information about the EASDF is obtained by the SMF based on EAS deployment information. The deployment information of the EAS is obtained from the policy information of the PDU session or the subscription information of the terminal. Specifically, during the PDU session establishment procedure, the SMF obtains the EAS deployment information through the PCF PDU session related policy, or the SMF pre-configures the EAS deployment information based on the UE subscription. The SMF selects an EASDF based on the EAS deployment information and sends the address of the selected EASDF to the UE as the DNS server for the PDU session.

In some embodiments, the terminal has a DNS client function and supports at least one of the following functions: receiving the EASDF information sent by the SMF; sending a DNS query request to the EASDF or DNS server determined by the SMF; sending the EASDF or DNS server determined by the SMF to the upper layer application or service in the terminal; and receiving a DNS query request from an upper layer application or service in the terminal, and sending the received DNS query request to the EASDF or DNS server determined by the SMF.

In embodiments of the present disclosure, the terminal includes a DNS client function, supporting one or more of the following functions: receiving an EASDF address from the SMF; sending a DNS query request to the EASDF address or DNS server address provided by the SMF; sending the EASDF address or DNS server address received in the SMF to the upper-layer application or service in the UE; sending the DNS query request received from the upper-layer application or service in the UE to the EASDF address or DNS server address provided by the SMF.

The DNS client function of the terminal UE is located in the UE operating system or in the UE hardware. When the DNS client function of the terminal UE is located in the UE hardware, the function is supported and implemented by both the hardware and the operating system.

In embodiments of the present disclosure, the terminal can determine the priority indication of the DNS information for itself based on the SMF, and make DNS policy decisions based on the priority indication of the DNS information, so as to determine the optimal EASDF or DNS server for optimal access to the EASDF or DNS server, thereby minimizing number of the routing paths between the terminal and the target EASDF or DNS server with less latency, improving the efficiency of data transmission, and providing users with a better user experience.

Figure 3:
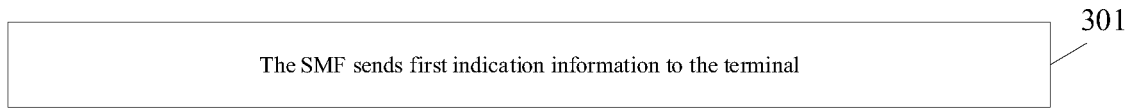
FIG. 3 is a schematic flowchart of a method for selecting an edge application server according to an exemplary embodiment.

FIG. 3 is a schematic flowchart of a method for selecting an edge application server according to an exemplary embodiment. As shown in FIG. 3, the method for selecting an edge application server in the embodiment of the present disclosure is applied to an SMF side. The method for selecting the edge application server includes the following processing steps:

Step 301: The SMF sends first indication information to the terminal.

Here, the first indication information is configured to indicate the priority of DNS information. The first indication information includes: priority indication information; or service identification; or application identification; or priority indication and application wildcard indication; or priority indication and specific application identification. The first indication information includes a priority indication of DNS information, including any one of the following: priority indication (explicit), service or application identification (implicit), priority indication and application wildcard indication, priority indication and specific application identification.

In some embodiments, the SMF obtains EAS deployment information, and selects an EASDF for the terminal based on the EAS deployment information. Specifically, during the PDU session establishment procedure, the SMF sends a first message to the terminal. The first message contains the information about the EASDF. The first message includes the PDU session establishment accept message. Specifically, during the PDU session establishment procedure, the SMF obtains the EAS deployment information through the PCF PDU session related policy, or the SMF pre-configures the EAS deployment information based on the UE subscription. The SMF selects an EASDF based on the EAS deployment information, and sends the address of the selected EASDF to the UE as the DNS server for the PDU session.

In some embodiments, the SMF obtains the DNS policy decision of the terminal and performs reporting or redirection based on operator policy. The operator policy includes: when the SMF determines that DNS target object of the terminal is not an EASDF determined by the SMF based on the DNS query request of the DNS policy decision, performing a DNS change report or a DNS query request redirection according to at least one of the following: network status, DNS priority, and service characteristics.

When the SMF detects that DNS target object of the terminal is not an EASDF determined by the SMF, it performs a subscription report in response to the subscribed DNS change notification.

When the SMF detects that DNS target object of the terminal is not an EASDF determined by the SMF, in response to performing DNS query redirection of the operator policy, the DNS query request redirection is performed and the DNS query request is sent to the EASDF determined by the SMF for the terminal.

Specifically, the SMF obtains the execution policy of the UE DNS query, uses the EASDF address provided by the SMF or the DNS address set by the UE itself, sends a DNS query request, and performs reporting or redirection based on the operator policy. The operator policy includes that when the destination address of the DNS query request received by SMF is not the EASDF address provided by SMF to the UE, it will perform DNS change reporting or DNS query request redirection based on one or more information such as network status, DNS priority, service characteristics, etc.

If the DNS change notification is subscribed, that is, the destination address of the DNS query request is not the EASDF address provided by SMF to the UE, then when SMF detects that the destination address of the DNS query request is not the EASDF address provided by SMF to the UE, SMF performs a subscription report.

If the operator policy requires redirection of DNS query requests, then when SMF detects a DNS change, that is, the destination address of the DNS query request is not the EASDF address provided by SMF to the UE, SMF performs redirection of DNS query request and sends the DNS query request to the EASDF address selected by SMF.

The essence of the technical solutions of the embodiments of the present disclosure will be further clarified below with reference to specific examples.

If the Fully Qualified Domain Name (FQDN) in the DNS query matches the FQDN provided by the SMF, EASDF will perform one of the following options according to the SMF instruction:

Option A: EASDF carries the EDNS Client Subnet option in the DNS request (Query) message, and sends the DNS Query message to the DNS server to resolve the FQDN. The DNS server resolves the EAS IP address based on the EDNS client subnet option and sends a DNS response to EASDF;

Option B: EASDF sends a DNS query message to the local DNS server, and the local DNS server is responsible for parsing the FQDN in the corresponding L-DN. EASDF receives the DNS Response corresponding message from the local DNS server.

The EAS discovery process using EASDF is as follows, in which SMF sends the EASDF address and corresponding priority information to the UE for the UE to make DNS policy decisions. Optionally, after SMF learns the DNS policy of the terminal, it reports or redirects the DNS information according to the operator policy. This ensures the optimization of EAS in edge computing application scenarios, ensures latency and routing optimization, and improves user experience.

Figure 4:
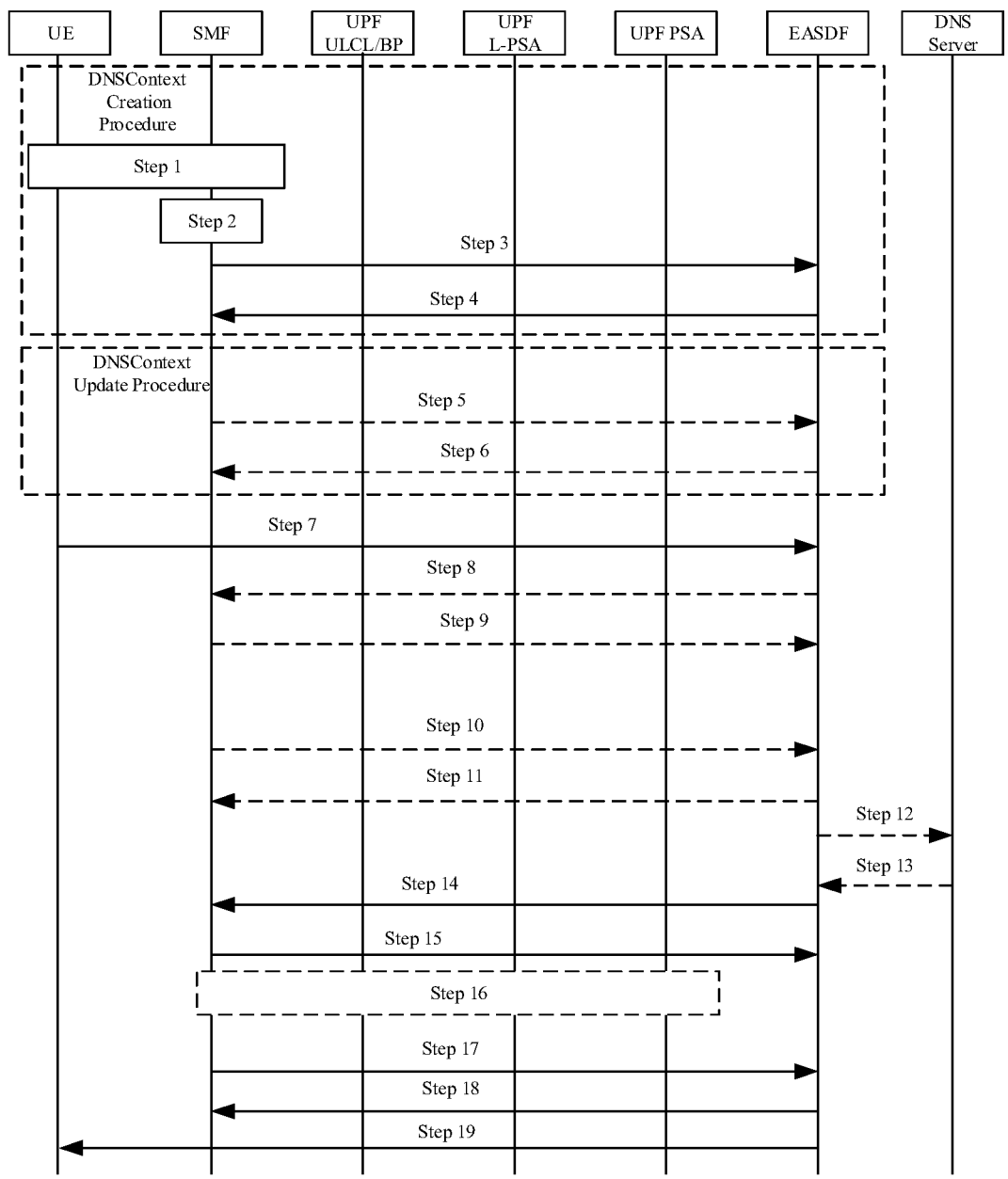
FIG. 4 is a schematic flowchart of a method for selecting an edge application server according to an exemplary embodiment.

FIG. 4 is a schematic flowchart of a method for selecting an edge application server according to an exemplary embodiment. As shown in FIG. 4, the method for selecting the edge application server according to an embodiment of the present disclosure includes the following processing steps:

Step 1, in the PDU session establishment procedure, the UE sends a PDU session establishment request to the SMF.

Step 2, during the PDU session establishment procedure, SMF performs EASDF selection. SMF selects an EASDF as the DNS server for the PDU session based on the UE subscription information. The SMF obtains the EAS deployment information through the PCF PDU session related policy, or the SMF pre-configures the EAS deployment information based on the UE subscription, and the SMF selects an EASDF based on the EAS deployment information.

If SMF determines, based on local configuration, that the interaction between EASDF and DNS Server in the DN needs to be carried out through PSAUPF, then SMF configures PSAUPF in the N4 rule and forwards DNS messages between EASDF and DN.

Step 3, SMF sends a Neasdf_DNSContext_Create Request message to the selected EASDF, and the Neasdf_DNSContext_Create Request message carries information such as the UE IP address, SUPI, DNN, notification endpoint, and DNS message processing rules.

After completing this processing, SMF carries the EASDF IP address in the PDU Session Establishment Accept message and sends it to the UE as a DNS server. The terminal UE configures EASDF as the DNS server for the PDU session.

In order to ensure that the EASDF address provided by SMF is used in subsequent UE DNS queries, in the PDU session establishment accept message, SMF not only carries the EASDF IP address as the DNS server and sends it to the UE, but also carries the priority indication of the DNS information to the UE. The priority indication includes any of the following: priority indication (explicit), service or application identification (implicit), priority indication and application wildcard indication, priority indication and specific application identification.

Step 4, EASDF creates a DNS context for the PDU session and stores the UE IP address, Subscriber Permanent Identifier (SUPI), notification endpoint and possible provided DNS message processing rules into the context. EASDF calls the service operation Neasdf_DNSContext_Create Response and sends the response message to SMF.

Step 5, SMF can call the Neasdf_DNSContext_Update Request message to EASDF, and the Neasdf_DNSContext_Update Request message carries the EASDF context ID and DNS message processing rules. The triggering conditions for the update process include that the UE moves to a new location, or EASDF reports certain FQDN EASDF DNS queries, or the insertion/deletion of the Local PDU session anchor (PSA) leads to the update of DNS processing rules.

Step 6, EASDF responds to the Neasdf_DNSContext_Update Response message and sends an update response message to SMF.

Step 7, the terminal UE sends a DNS query message to EASDF.

The terminal UE has previously received the EASDF address and the priority indication of DNS information provided by the SMF, makes a DNS policy decision based on the priority indication, sends a DNS query to the edge application server discovery function EASDF, and performs the discovery or selection of the edge application server.

Here, the DNS policy decision of the UE includes any of the following: prioritizing the execution of the DNS request (EASDF) provided by the SMF, prioritizing the execution of the DNS request set locally by the UE, and the UE deciding the execution strategy of the DNS request (selecting the EASDF address provided by the SMF or the DNS address set locally by the UE) on its own. In this embodiment, the UE DNS policy decision prioritize the EASDF.

The terminal UE also includes a DNS client function, supporting one or more of the following functions: receiving the EASDF address or DNS server address from the SMF; sending a DNS query request to the EASDF address or DNS server address provided by the SMF; sending the EASDF address or DNS server address received from the SMF to the upper-layer application or service in the UE; and sending the DNS query request received from the upper-layer application or service in the UE to the EASDF address or DNS server address provided by the SMF.

The DNS client function of the terminal UE can be implemented in the UE application layer interface, or in the UE operating system, or in the UE hardware. When the DNS client function of the terminal UE is located in the UE hardware, the function is supported and implemented by both the hardware and the operating system.

Step 8, if the query message meets the processing rules for DNS message reporting, EASDF reports the DNS message to SMF by calling Neasdf_DNSContext_Notify Request.

SMF obtains the execution policy of the UE DNS query, that is, whether the UE uses the EASDF address provided by the SMF or the DNS address set by the UE itself, and sends the DNS query request to the network side. SMF performs reporting or redirection based on operator policy. The operator policy here includes that when the destination address of the DNS query request received by SMF is not the EASDF address provided by SMF to the UE, it performs DNS change reporting or DNS query request redirection based on one or more information such as network status, DNS priority, service characteristics, etc.

If the DNS change notification is subscribed (that is, the destination address of the DNS query request is not the EASDF address provided by SMF to the UE), then when SMF detects that the destination address of the DNS query request is not the EASDF address provided by SMF to the UE, SMF performs a subscription report.

If the operator policy requires redirection of DNS query requests, then when SMF detects a DNS change (that is, the destination address of the DNS query request is not the EASDF address provided by SMF to the UE), SMF performs redirection of DNS query request and sends the DNS query request to the EASDF address selected by SMF.

Step 9, SMF sends the corresponding response message to EASDF in response to the Neasdf_DNSContext_Notify Response message.

Step 10, if the DNS message processing rules of the FQDN received in the report need to be updated, such as providing updated information to build EDNS Client Subnet option information, then SMF will call Neasdf_DNSContext_Update Request (DNS message processing rules) to EASDF.

For the aforementioned Option A, the DNS processing rules include the corresponding IP addresses configured to build the EDNS client subnet options. For option B, the DNS processing rules include: Local DNS server IP address. DNS processing rules can also instruct EASDF to simply forward DNS queries to pre-configured DNS servers/resolvers.

Step 11, EASDF sends a response message to SMF in response to the Neasdf_DNSContext_Update Response message.

Step 12, EASDF processes the DNS query message received from the terminal UE as follows:
for option A, EASDF adds the EDNS client subnet option to the DNS query message and sends it to the C-DNS server; and
for option B, EASDF sends the DNS Query message to the local DNS server.

If there is no DNS message detection template in the DNS message processing rules provided by SMF that matches the FQDN requested in the DNS Query, EASDF can directly send the DNS Query to the pre-configured DNS server/resolver.

Step 13, EASDF receives the DNS Response message from the DNS system and determines whether the DNS Response message can be sent to the UE.

Step 14, if the IP address of EAS or FQDN in the DNS response message matches the reporting conditions provided by SMF, EASDF can request to send the DNS message to SMF by calling Neasdf_DNSContext_Notify, and the DNS message includes EAS information. If EASDF receives multiple EAS IP addresses from the contacted DNS server, the DNS message report may contain multiple EAS IP addresses. DNS message reports may contain the FQDN and EDNS client subnet options received in the DNS response message.

Upon receiving the DNS message processing rules, EASDF first caches the DNS Response message until it receives the SMF notification and then sends the DNS Response message to the UE. If caching and reporting of DNS response messages is requested and single reporting control is set, EASDF will report to SMF once when it detects that the DNS message detection template matches.

Step 15, SMF calls Neasdf_DNSContext_Notify to respond to the service operation.

Step 16, SMF optionally performs selection and insertion of the uplink classifier or local session anchor UPF, and selects and inserts the UL CL/BP and Local PSA.

Based on the EAS information received from EASDF, other UPF selection criteria, and service experience or performance analysis of edge applications, SMF can determine DNAI and determine DNAS-related N6 wireless data routing information. SMF optionally performs UL CL/BP and Local PSA selection and insertion. In the case of UpLink Classifier (UL CL), SMF determines traffic detection rules and data routing rules based on the IP address range of each DNAI.

Step 17, SMF calls Neasdf_DNSContext_Update Request to request message and sends it to EASDF, carrying DNS message processing rules. The DNS message processing rule instructs the EASDF to send the cached DNS response message to the terminal UE.

Step 18, EASDF sends the corresponding response message to SMF in response to the Neasdf_DNSContext_Update Response message.

Step 19, EASDF sends a DNS response message to the terminal UE.

In embodiments of the present disclosure, for the selection of edge computing application server, DNS query is sent to the appropriate DNS server, which ensures that EAS is always the preferred server and ensures that the terminal uses EASDF to find the best EAS, thereby truly improving the data transmission efficiency, reducing service delays, reducing data transmission routing paths and improving user service experience.

In embodiments of the present disclosure, the function of using EASDF to discover EAS is also applicable to applications where SMF provides corresponding information of DNS server and DNS resolver, instead of the EASDF IP address as the server.

Figure 5:
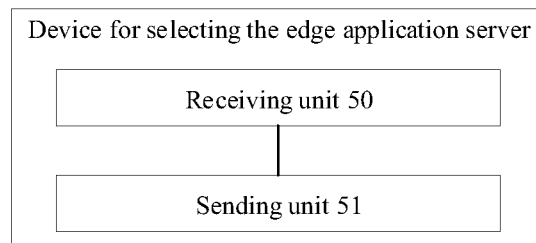
FIG. 5 is a schematic structural diagram of a device for selecting an edge application server according to an exemplary embodiment.

FIG. 5 is a schematic structural diagram of a device for selecting an edge application server according to an exemplary embodiment. As shown in FIG. 5, the device for selecting the edge application server according to an embodiment of the present disclosure is applied to a terminal. The device includes:
a receiving unit 50 configured to receive first indication information sent by the SMF; the first indication information is configured to indicate the priority of the domain name system DNS information; and
a sending unit 51 configured to make a DNS policy decision based on the first indication information, and send a DNS query request to EASDF; the DNS query request is used for the EASDF to perform the discovery or selection of the edge application server EAS.

In some embodiments, the first indication information includes:
priority indication information; or,
a service identification; or,
an application identification; or,
a priority indication and an application wildcard indication; or,
a priority indication and a specific application identification.

In some embodiments, the DNS policy decision includes:
prioritizing the execution of DNS request provided by the SMF; or,
prioritizing the execution of DNS request configured locally by the terminal; or,
the terminal determining the execution strategy of the DNS request by itself.

In some embodiments, the receiving unit 50 is also configured to:
during the PDU session establishment procedure, receive a first message sent by the SMF, and the first message contains information about the EASDF selected by the SMF for the PDU session.

In some embodiments, the EASDF information is obtained from the SMF based on EAS deployment information; the EAS deployment information is obtained from the policy information of the PDU session or the subscription information of the terminal.

In some embodiments, the terminal has a DNS client function and supports at least one of the following functions:

receiving the EASDF information sent by the SMF;

sending a DNS query request to the EASDF or DNS server determined by the SMF;

sending the EASDF or DNS server determined by the SMF to an upper layer application or service in the terminal; and receiving a DNS query request from an upper layer application or service in the terminal, and sending the received DNS query request to the EASDF or DNS server determined by the SMF.

In some embodiments, the DNS client function of the terminal is located in the operating system or hardware of the terminal.

In some embodiments, when the DNS client function of the terminal is located in hardware, the DNS client function of the terminal is supported and implemented by both the hardware and the operating system.

In an embodiment, the receiving unit 50, the sending unit 51, etc. may be configured by one or more central processing units (CPUs), graphics processing units (GPUs), baseband processors (BPs), Application Specific Integrated Circuits (ASICs), Digital Signal Processors (DSPs), Programmable Logic Devices (PLDs), Complex Programmable Logic Devices (CPLDs), Field-Programmable Gate Arrays (FPGAs), general-purpose processors, controllers, microcontrollers (MCUs), microprocessors, or other electronic components. It can also be implemented in combination with one or more radio frequency (RF) antennas for performing the steps of the method for selecting the edge application server in the foregoing embodiments.

In embodiments of the present disclosure, the specific manner in which the respective units in the device for selecting the edge application server shown in FIG. 5 performs operations has been described in detail in the method embodiment, and will not be repeated here.

Figure 6:
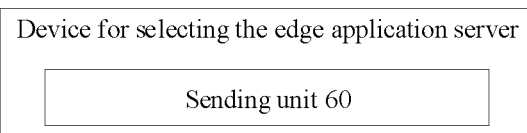
FIG. 6 is a schematic structural diagram of a device for selecting an edge application server according to an exemplary embodiment.

FIG. 6 is a schematic structural diagram of a device for selecting an edge application server according to an exemplary embodiment. As shown in FIG. 6, the device for selecting the edge application server according to the embodiment of the present disclosure is applied to SMF. The device includes:

a sending unit 60 configured to send first indication information to the terminal, where the first indication information is configured to indicate the priority of DNS information.

In some embodiments, the first indication information includes:

priority indication information; or, a service identification; or, an application identification; or, a priority indication and an application wildcard indication; or, a priority indication and a specific application identification.

In some embodiments, based on the device for selecting the edge application server shown in FIG. 6, the device further includes:

an obtaining unit (not shown in FIG. 6), configured to obtain EAS deployment information; and a selection unit (not shown in FIG. 6), configured to select an EASDF for the terminal based on the EAS deployment information;

the sending unit 60 is also configured to send a first message to the terminal during the PDU session establishment procedure; the first message contains the information of the EASDF.

In some embodiments, the obtaining unit is also configured to:

obtaining the EAS deployment information through the policy information of the PDU session or the subscription information of the terminal.

In some embodiments, the obtaining unit is further configured to obtain the DNS policy decision of the terminal, and the sending unit is further configured to perform reporting or redirection based on operator policy.

In some embodiments, the operator policy includes:

when determining that the terminal DNS target object is not an EASDF determined by the SMF based on the DNS query request of the DNS policy decision, DNS change reporting or DNS query request redirection is performed according to at least one of the following:

network status, DNS priority, and service characteristics.

In some embodiments, based on the device for selecting the edge application server shown in FIG. 6, the device further includes:

a first processing unit (not shown in FIG. 6) configured to perform a subscription report in response to the subscribed DNS change notification when detecting that DNS target object of the terminal is not an EASDF determined by the SMF.

In some embodiments, based on the device for selecting the edge application server shown in FIG. 6, the device further includes:

a second processing unit (not shown in FIG. 6) configured to, when detecting that DNS target object of the terminal is not an EASDF determined by the SMF, in response to performing DNS query redirection of the operator policy, the DNS query request redirection is performed and the DNS query request is sent to the EASDF determined by the SMF for the terminal.

In an embodiment, the sending unit 60, the obtaining unit, the selecting unit, the first processing unit, the second processing unit, etc. may be implemented by one or more central processing units (CPUs), graphics processing units (GPUs), baseband processors (BPs), Application Specific Integrated Circuits (ASICs), Digital Signal Processors (DSPs), Programmable Logic Devices (PLDs), Complex Programmable Logic Devices (CPLDs), Field-Programmable Gate Arrays (FPGAs), general-purpose processors, controllers, microcontrollers (MCUs), microprocessors, or other electronic components. It can also be implemented in combination with one or more radio frequency (RF) antennas for performing the steps of the method for selecting the edge application server in the foregoing embodiments.

In embodiments of the present disclosure, the specific manner in which the respective units in the device for selecting the edge application server shown in FIG. 6 performs operations has been described in detail in the method embodiment, and will not be repeated here.

Figure 7:
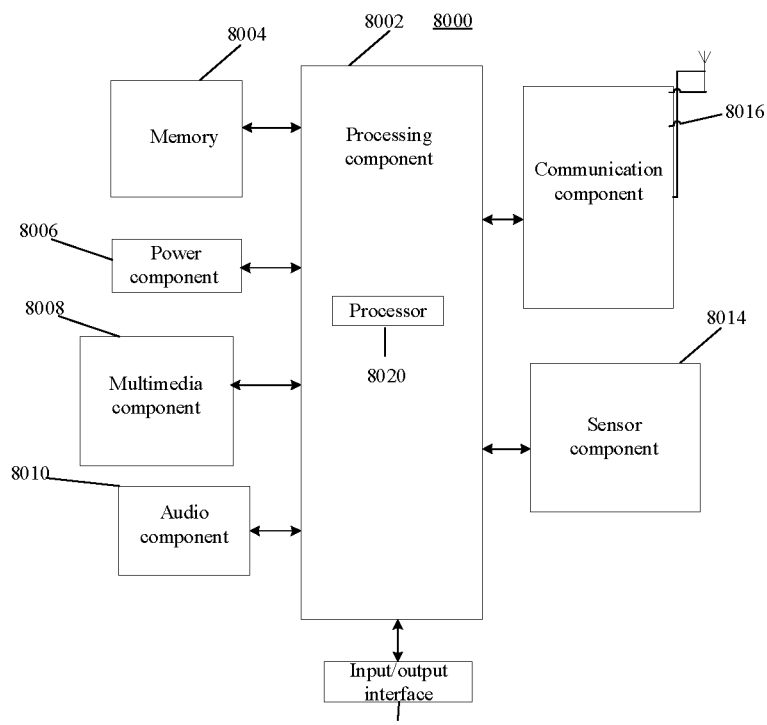
FIG. 7 is a schematic structural diagram of a user equipment according to an exemplary embodiment.

FIG. 7 is a block diagram of a user equipment 8000 according to an exemplary embodiment. For example, the user equipment 8000 may be a mobile phone, a computer, a digital broadcast terminal, a messaging device, a game console, a tablet device, a medical device, a fitness device, a personal digital assistant, or the like.

Referring to FIG. 7, the user equipment 8000 may include one or more of the following components: a processing component 8002, a memory 8004, a power component 8006, a multimedia component 8008, an audio component 8010, an input/output (I/O) interface 8012, a sensor component 8014, and a communication component 8016.

The processing component 8002 generally controls the overall operations of user equipment 8000, such as operations associated with display, phone calls, data communications, camera operations, and recording operations. The processing component 8002 may include one or more processors 8020 to execute instructions to complete all or part of the steps of the above method. Additionally, the processing component 8002 may include one or more modules that facilitate interaction between the processing component 8002 and other components. For example, the processing component 8002 may include a multimedia module to facilitate interaction between the multimedia component 8008 and the processing component 8002.

The memory 8004 is configured to store various types of data to support operations at device 8000. Examples of such data include instructions for any application or method operating on the user equipment 8000, contact data, phonebook data, messages, pictures, videos, etc. The memory 8004 may be implemented by any type of volatile or non-volatile storage device or a combination thereof, such as static random-access memory (SRAM), electrically erasable programmable read-only memory (EEPROM), erasable Programmable read-only memory (EPROM), programmable read-only memory (PROM), read-only memory (ROM), magnetic memory, flash memory, magnetic or optical disk.

Power component 8006 provides power to various components of user equipment 8000. Power components 8006 may include a power management system, one or more power supplies, and other components associated with generating, managing, and distributing power to user equipment 8000.

The multimedia component 8008 includes a screen that provides an output interface between user equipment 8000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. A touch sensor can not only sense the boundaries of a touch or swipe action, but also detect the duration and pressure associated with the touch or swipe action. In some embodiments, the multimedia component 8008 includes a front camera and/or a rear camera. When the device 8000 is in an operating mode, such as a shooting mode or a video mode, the front camera and/or the rear camera may receive external multimedia data. Each front camera and rear camera can be a fixed optical lens system or have a focal length and optical zoom capabilities.

The audio component 8010 is configured to output and/or input audio signals. For example, the audio component 8010 includes a microphone (MIC) configured to receive external audio signals when user equipment 8000 is in operating modes, such as call mode, recording mode, and speech recognition mode. The received audio signal may be further stored in the memory 8004 or sent via the communication component 8016. In some embodiments, the audio component 8010 also includes a speaker for outputting audio signals.

The I/O interface 8012 provides an interface between the processing component 8002 and a peripheral interface module. The peripheral interface module may be a keyboard, a click wheel, a button, etc. These buttons may include, but are not limited to: Home button, Volume buttons, Start button, and Lock button.

The sensor component 8014 includes one or more sensors that provide various aspects of status assessment for user equipment 8000. For example, the sensor component 8014 can detect the open/closed state of the device 8000, and the relative positioning of components, such as the display and keypad of the user equipment 8000. The sensor component 8014 can also detect the position change in the user equipment 8000 or a component in the user equipment 8000, the presence or absence of user contact with the user equipment 8000, the orientation or acceleration/deceleration of the user equipment 8000 and temperature changes of the user equipment 8000. The sensor component 8014 may include a proximity sensor configured to detect the presence of nearby objects without any physical contact. The sensor component 8014 may also include a light sensor, such as a CMOS or CCD image sensor, for use in imaging applications. In some embodiments, the sensor component 8014 may also include an acceleration sensor, a gyroscope sensor, a magnetic sensor, a pressure sensor, or a temperature sensor.

The communication component 8016 is configured to facilitate wired or wireless communication between the user equipment 8000 and other devices. User equipment 8000 may access a wireless network based on a communication standard, such as Wi-Fi, 2G or 3G, or a combination thereof. In an embodiment, the communication component 8016 receives broadcast signals or broadcast related information from an external broadcast management system via a broadcast channel. In an embodiment, the communications component 8016 also includes a near field communications (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In an embodiment, user equipment 8000 may be configured by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the steps of the above method for selecting the edge application server.

In an embodiment, a non-transitory computer-readable storage medium including instructions, such as a memory 8004 including instructions, which can be executed by the processor 8020 of the user equipment 8000 to complete the steps of the above-mentioned method for selecting the edge application server is also provided. For example, non-transitory computer-readable storage media may be ROM, random access memory (RAM), CD-ROM, magnetic tape, floppy disk, optical data storage device, etc.

An embodiment of the present disclosure also provides a terminal, which includes a processor, a transceiver, a memory, and an executable program stored in the memory and capable of being run by the processor. When the processor runs the executable program, it executes the steps of the method for selecting an edge application server on the terminal side of the foregoing embodiment.

The embodiment of the present disclosure also provides a network element device, which includes a processor, a transceiver, a memory, and an executable program stored in the memory and capable of being run by the processor. When the processor runs the executable program, it executes the steps of the method for selecting an edge application server on the SMF side of the foregoing embodiment.

An embodiment of the present disclosure also provides a storage medium on which an executable program is stored, and the executable program is used by a processor to execute the steps of the method for selecting the edge application server of the aforementioned embodiment.

Other implementations of the embodiments of the disclosure will be readily apparent to those skilled in the art from consideration of the specification and practice of the disclosure herein. This application is intended to cover any variations, uses, or adaptations of the embodiments of the present disclosure that follow the general principles of the embodiments of the present disclosure and include common knowledge or common technical means in the technical field not disclosed by the embodiments of the present disclosure. It is intended that the specification and examples be considered as exemplary only, with a true scope and spirit of the embodiments of the disclosure being indicated by the following claims.

It is to be understood that the embodiments of the present disclosure are not limited to the precise structures described above and illustrated in the accompanying drawings, and various modifications and changes may be made without departing from the scope thereof. The scope of embodiments of the disclosure is limited only by the appended claims.

What is claimed is:

1. A method for selecting an edge application server, performed by a terminal, comprising:
    receiving first indication information sent by a session management function (SMF), wherein the first indication information is configured to indicate a priority of domain name system (DNS) information; and
    making a DNS policy decision based on the first indication information, and sending a DNS query request to an edge application server discovery function (EASDF), wherein the DNS query request is used for the EASDF to perform discovery or selection of the edge application server (EAS),
    wherein the DNS policy decision is obtained by the SMF, and the SMF performs report or redirection based on an operator policy,
    wherein the operator policy comprises:
    in a case where the SMF determines that a DNS target object of the terminal is not an EASDF determined by the SMF based on a DNS query request of the DNS policy decision, performing DNS change report or DNS query request redirection according to at least one of the following:
    a network status, a DNS priority, and a service characteristic.

2. The method according to claim 1, wherein the first indication information comprises:
    priority indication information; or
    a service identification; or
    an application identification; or
    a priority indication and an application wildcard indication; or
    a priority indication and a specific application identification.

3. The method according to claim 1, wherein the DNS policy decision comprises:
    prioritizing execution of a DNS request provided by the SMF; or
    prioritizing execution of a DNS request configured locally by the terminal; or
    the terminal determining an execution strategy of a DNS request by itself.

4. The method according to claim 1, wherein receiving the first indication information sent by SMF comprises:
    during a protocol data unit (PDU) session establishment procedure, receiving a first message sent by the SMF, wherein the first message contains information about EASDF selected by the SMF for the PDU session.

5. The method according to claim 4, wherein the information about the EASDF is obtained by the SMF based on EAS deployment information; and the EAS deployment information is obtained from policy information of the PDU session or subscription information of the terminal.

6. The method according to claim 4, wherein the terminal has a DNS client function and supports at least one of the following functions:
    receiving the information about the EASDF sent by the SMF;
    sending the DNS query request to the EASDF or DNS server determined by the SMF;
    sending the EASDF or DNS server determined by the SMF to an upper layer application or service in the terminal; and
    receiving the DNS query request from the upper layer application or service in the terminal, and sending the received DNS query request to the EASDF or DNS server determined by the SMF.

7. The method according to claim 6, wherein the DNS client function of the terminal is located in an operating system of the terminal or a hardware of the terminal.

8. The method according to claim 7, wherein in a case where the DNS client function of the terminal is located in the hardware, the DNS client function of the terminal is supported and implemented by both the hardware and the operating system.

9. A non-transitory storage medium on which an executable program is stored, when the executable program is executed by a processor, the steps of the method for selecting the edge application server according to claim 1 are implemented.

10. A method for selecting edge application servers, performed by a session management function (SMF), comprising:
    sending first indication information to a terminal, wherein the first indication information is configured to indicate a priority of domain name system (DNS) information;
    obtaining a DNS policy decision of the terminal; and
    performing report or redirection based on an operator policy,
    wherein the operator policy comprises:
    in a case where the SMF determines that a DNS target object of the terminal is not an EASDF determined by the SMF based on a DNS query request of the DNS policy decision, performing DNS change report or DNS query request redirection according to at least one of the following:
    a network status, a DNS priority, and a service characteristic.

11. The method according to claim 10, wherein the first indication information comprises:
    priority indication information; or,
    a service identification; or,
    an application identification; or,
    a priority indication and an application wildcard indication; or,
    a priority indication and a specific application identification.

12. The method according to claim 10, further comprising:
    obtaining EAS deployment information, and selecting EASDF for the terminal based on the EAS deployment information; and during a protocol data unit (PDU) session establishment procedure, sending a first message to the terminal, wherein the first message contains information about the EASDF.

13. The method according to claim 12, wherein obtaining the EAS deployment information comprises:
obtaining the EAS deployment information from policy information of the PDU session or subscription information of the terminal.

14. The method according to claim 10, further comprising:
in a case where the SMF detects that the DNS target object of the terminal is not the EASDF determined by the SMF, in response to a subscribed DNS change notification, performing a subscription report.

15. The method according to claim 10, further comprising:
in a case where the SMF detects that the DNS target object of the terminal is not the EASDF determined by the SMF, in response to performing the DNS query redirection of the operator policy, performing the DNS query request redirection and sending the DNS query request to the EASDF determined by the SMF for the terminal.

16. A network element device, comprising a processor, a transceiver, a memory, and an executable program stored in the memory and capable of being run by the processor, when the processor runs the executable program, it executes steps of the method for selecting the edge application server according to claim 10.

17. A non-transitory storage medium on which an executable program is stored, when the executable program is executed by a processor, the steps of the method for selecting the edge application server according to claim 10 are implemented.

18. A terminal, comprising a processor, a transceiver, a memory, and an executable program stored in the memory and capable of being run by the processor, when the processor runs the executable program, the process is configured to:
receiving first indication information sent by a session management function (SMF), wherein the first indication information is configured to indicate a priority of domain name system (DNS) information; and
making a DNS policy decision based on the first indication information, and sending a DNS query request to an edge application server discovery function (EASDF), wherein the DNS query request is used for the EASDF to perform discovery or selection of the edge application server (EAS),
wherein the DNS policy decision is obtained by the SMF, and the SMF performs report or redirection based on an operator policy,
wherein the operator policy comprises:
in a case where the SMF determines that a DNS target object of the terminal is not an EASDF determined by the SMF based on a DNS query request of the DNS policy decision, performing DNS change report or DNS query request redirection according to at least one of the following:
a network status, a DNS priority, and a service characteristic.

* * * * *